July 6, 1948.  C. H. RICHARDSON  2,444,470
VARIABLE SPEED MECHANISM
Filed Feb. 28, 1944  3 Sheets-Sheet 1
Fig. 1.
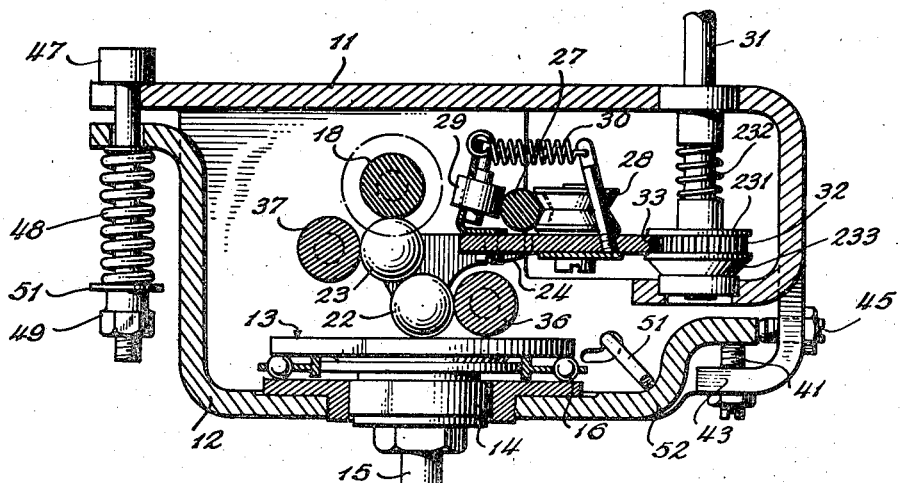
Fig. 2.
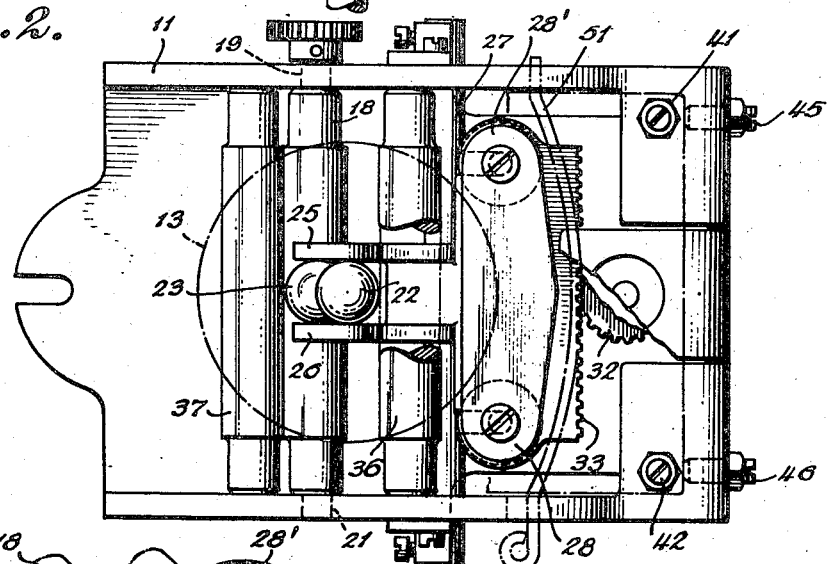
Fig. 3.
INVENTOR
CHARLES H. RICHARDSON
BY
Herbert H. Thompson
ATTORNEY.

July 6, 1948.   C. H. RICHARDSON   2,444,470
VARIABLE SPEED MECHANISM
Filed Feb. 28, 1944   3 Sheets-Sheet 2
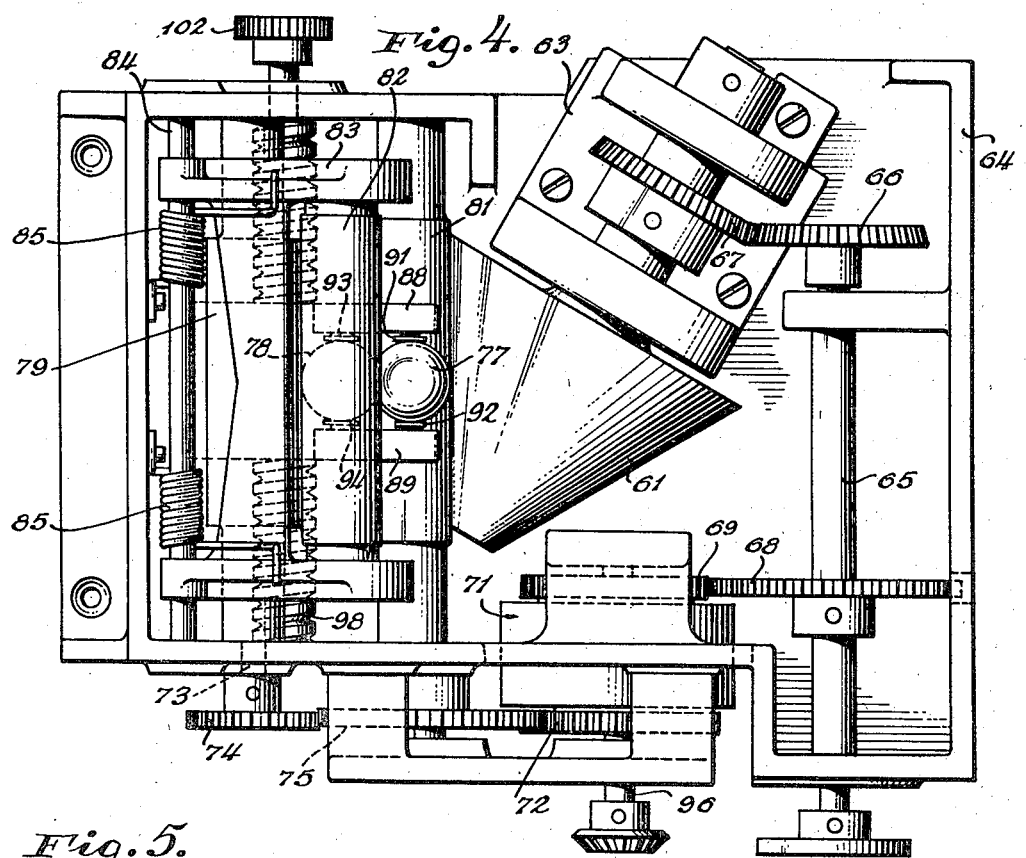
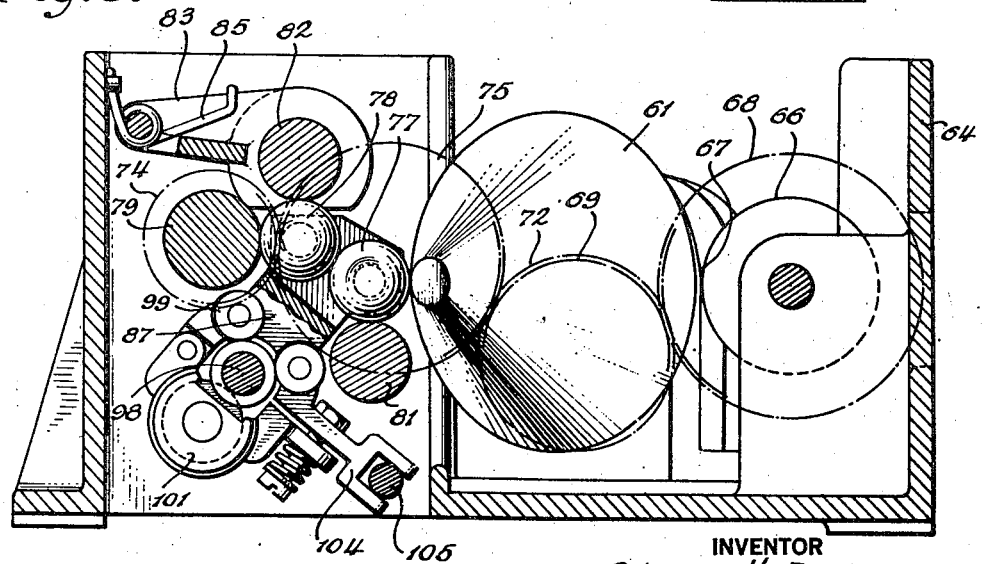
INVENTOR
CHARLES H. RICHARDSON
BY
Herbert P. Thompson
his ATTORNEY.

July 6, 1948.  C. H. RICHARDSON  2,444,470
VARIABLE SPEED MECHANISM
Filed Feb. 28, 1944  3 Sheets-Sheet 3
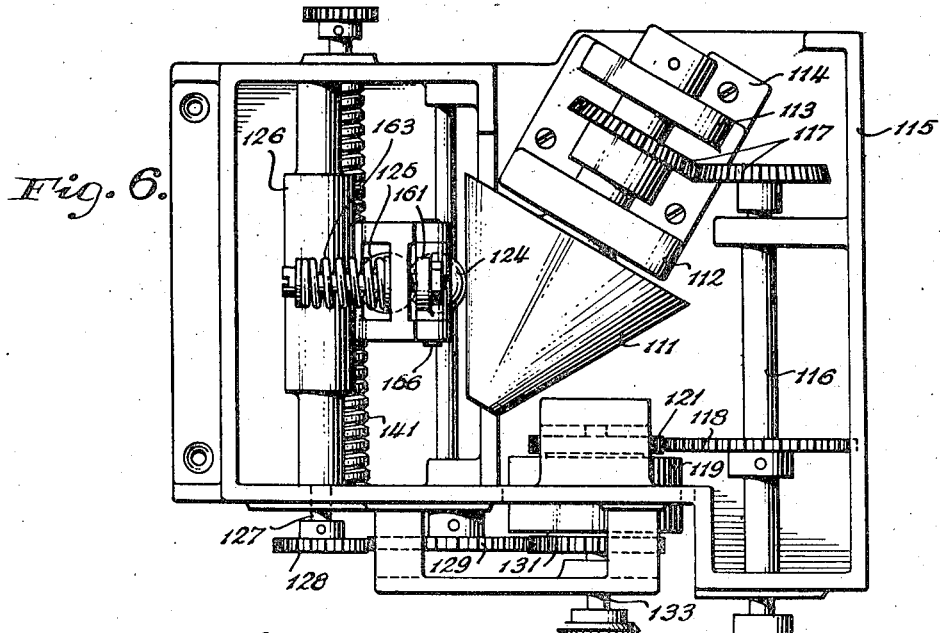
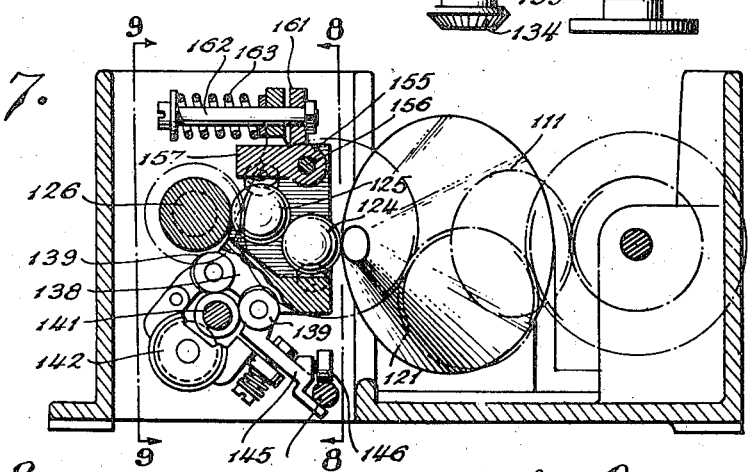
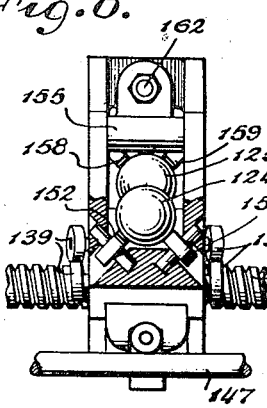
INVENTOR
CHARLES H. RICHARDSON
BY
Herbert H. Thompson
his ATTORNEY.

Patented July 6, 1948

2,444,470

UNITED STATES PATENT OFFICE 2,444,470

VARIABLE-SPEED MECHANISM

Charles H. Richardson, Great Neck, N. Y., assignor to The Sperry Corporation, a corporation of Delaware Application February 28, 1944, Serial No. 524,305

8 Claims. (Cl. 74—193)

This invention relates generally to variable speed mechanisms of the friction drive type, and particularly concerns the positioning and guiding of one or more balls for transmitting motion between two rotary members.

Variable speed mechanisms of this type have usually consisted of a circular driving member, a cylindrical driven member, and one or more balls retained between these members by a carriage movable radially of the driving member to vary the speed ratio of transmitted motion. Devices of this character have usually been constructed with the centers of the balls in a line through the axis of the output drum or cylinder and perpendicular to the surface of the circular driving member. Frequently two rollers are arranged to engage each of the balls to restrain them in a plane normal to the axis of the output cylinder; this requires four guide rollers in a carriage for guiding two balls.

The balls are usually restrained from movement along the axis of the output cylinder by buttons or guide rollers arranged to engage the balls at the poles of the axes of normal rotation. Frictional engagement between the balls has been accomplished by various methods usually including a resilient device, such as a spring for compressing the members in a manner to maintain frictional engagement with the balls.

Unless the guide rollers for each ball are arranged to fit snugly, play may be introduced which will destroy the exactness required in the operation of the mechanism. For this reason, it has been necessary to provide a precision fit of the guide rollers to each of the balls.

It is usually desirable to arrange the balls to contact the circular driving member along a radial line. To accomplish this, the output cylinder must have its axis aligned with the axis and the selected radial line of the driving member. This alignment of the axes has required precision manufacture and assembly with small machine tolerances.

In use, variable speed mechanisms of this type have been subject to wear due to the frictional contact of the members and balls. This wear removes the original precision fit of the members and introduces play into the mechanism which affects its accuracy particularly over sustained periods of operation. Furthermore, efficiency of operation has been curtailed by the friction of four guide rollers for each ball in the carriage. Wear has been evident at the point where guiding members engage the balls at the poles of their principal axes of rotation, particularly when the mechanism is driven for any length of time with the ball carriage in one position.

These factors have made it difficult to service the mechanisms after they are put into use, although the necessity for servicing is aggravated by the excessive wear and low efficiency. Further, the difficulties in assembly and precision-fitting required a major overhaul rather than replacement of parts, in order to service the equipment.

It is a major object of this invention to provide a variable speed mechanism having parts that are more readily manufactured, assembled and serviced by a construction that eliminates many high precision tolerances and fitting of the parts during assembly operations.

Another object of the invention is to facilitate the assembly and increase the efficiency of variable speed mechanisms by reducing the number of guide rollers required in the ball carriage.

A further object of the invention is to eliminate the exactness formerly required in the alignment of the axes of the members and the centers of the balls by offsetting the balls on opposite sides of a line joining their points of contact.

A further object of the invention is to increase the accuracy of variable speed mechanisms, particularly to sustain accuracy over long periods of operation by having a construction providing resilient pressure for movable parts to compensate for wear.

A more specific object of the invention is to reduce wear at the poles of the normal axis of rotation of the balls by arranging a pair of angularly disposed guide rollers at opposite sides of a plane defined by the centers and points of contact of each of the offset balls.

Another specific object of the invention is to provide a variable speed mechanism having a pair of balls interposed between driving and driven members with their centers offset transversely of the axis of rotation of the driven member and spring pressed to maintain frictional engagement between the balls and members, regardless of wear.

A further specific object of the invention is to provide a simplified variable speed mechanism in which the driving member is supported in one part of a housing and the driven member in another, the two parts being connected by a fulcrum joint and spring pressed to maintain frictional engagement between the balls and the members.

A further object of the invention is to provide rollers mounted independently of the ball carriage by having them extend along the path of movement of the balls and supported in the frame of the mechanism for rotation about axes parallel to said path of movement.

A further object of the invention is to provide a variable speed mechanism in which frictional engagement between the balls, driving, and driven members is provided by a resiliently supported guide roller that exerts pressure on one of the balls to maintain said frictional engagement.

A still further object of the invention is to provide a variable speed mechanism having a conically-shaped driving member operating to rotate a driven member at a variable speed, the two members being connected to the input elements of a differential whereby the output element of the differential is rotated in a direction and at a speed dependent upon the difference between the speeds of rotation of the two members as determined by movement of a driven member along an element of the conical surface for the driving member.

Other objects and advantages of the invention will become apparent from the following specification taken in connection with the accompanying drawings, wherein:

Fig. 1 is a cross section of a disc, ball and cylinder type variable speed mechanism embodying the invention;

Fig. 2 is a bottom view of the variable speed mechanism shown in Fig. 1, with the lower part of the two-part housing removed and some parts broken away for purposes of clearness;

Fig. 3 is a perspective view of the operating parts of the mechanism shown in Figs. 1 and 2;

Fig. 4 is a top plan view of a modified variable speed mechanism embodying the invention and having a conically-shaped driving member;

Fig. 5 is a cross section of the variable speed mechanism shown in Fig. 4;

Fig. 6 is a top plan view of a further modified variable speed mechanism embodying the invention;

Fig. 7 is a cross section of the variable speed mechanism shown in Fig. 6;

Fig. 8 is a vertical section taken along the line 8—8 of Fig. 7; and

Fig. 9 is a vertical section taken along the line 9—9 of Fig. 7.

According to the present invention, a pair of balls are arranged in frictional engagement between a rotary driving member and a cylindrical driven member for transmitting motion between them. These balls have their centers offset transversely of the axis of rotation of the driven member, so only two guide rollers are required, when properly arranged, to cooperate with the members for restraining the balls from movement in a plane normal to the said axis of rotation. Frictional engagement may be maintained by exerting spring presure either between the driving and driven members, or on the guide rollers for the balls. The two guide rollers may be carried by the ball carriage or extend parallel to the path along which the balls move to vary the speed ratio of transmitted motion.

The variable speed mechanism shown in Figs. 1 to 3 inclusive has a housing consisting of two parts 11 and 12 the latter of which carries a driving member in the form of a disc 13, that is supported in a bearing 14 for rotation as by shaft 15, and is provided with a suitable thrust bearing 16. The upper part 11 of the casing has an output member in the form of a cylinder or drum 18 that is journaled at 19 and 21 in the casing part 11, which is, for reasons that will subsequently appear, arranged to avoid intersection with the axis of rotation of the disc 13.

A pair of balls 22 and 23 are arranged in frictional engagement with each other. The ball 22 engages the disc 13 along a radial line that is parallel to the axis of rotation of the cylinder 18. The ball 23 completes the friction drive from the ball 22 to the cylinder 18 and has its center offset with respect to the center of the ball 22 in a plane normal to the axis of rotation of the cylinder 18, that is, the centers of the balls are offset transversely of the axis of rotation of the cylinder 18.

These balls are movable along a path parallel to the axis of the cylinder 18 as by a ball carriage 24 having side members 25 and 26 arranged on opposite sides of the balls. A rail 27 carried by the casing part 11 supports the ball carriage for translatory movement by engagement of V-rollers 28 and 28' and roller 29, which are held in position by the action of tension spring 30. The ball carriage 24 is controlled in its movement by turning a shaft 31 that rotates pinion 32, meshing with rack 33 on the ball carriage to translate the balls radially of the disc 13 in the direction of the axis of rotation of the cylinder 18. Rotation of the ball carriage about the rail 27 is prevented by a shroud 231 that is pressed by compression spring 232 to hold the rack 33 against a collar 233 on the shaft 31.

In order to restrain the balls from movement laterally of the direction of movement of the ball carriage, that is, in a plane perpendicular to the axis of rotation of the cylinder 18, a pair of guide rollers 36 and 37 extend along the path of movement of the balls 22 and 23 and are journaled in the part 11 of the casing for rotation about axes parallel to the axis of rotation of the cylinder 18 and the path of movement of the balls. The roller 36 engages the ball 22 so it is held in position against movement in a plane transversely of the axis of rotation of the cylinder 18 by forces acting from three directions, namely, by the disc 13, the cylinder 36 and the ball 23. Similarly, the ball 23 is restrained by forces acting from three directions, namely, those forces exerted by the cylinder 18, the ball 22 and the guide roller 37.

With this arrangement of the balls offset transversely of the axis of rotation of the cylinder 18, only two guide rollers are required to restrain movement of the balls in a plane perpendicular to that axis, whereas four rollers had previously been required for this purpose. As pointed out above, this arrangement facilitates manufacture and assembly of the mechanism, increases efficiency by reducing frictional losses, and, as will appear, compensates for wear to maintain accuracy over sustained periods of operation.

From the description and illustration of the mechanism shown in Figs. 1 to 3 inclusive, it will be apparent that the balls and the members are arranged so a plane defined by the axis of rotation of the disc 13 and the center of the ball 22 is parallel to a plane defined by the axis of rotation of the cylinder 18 and the center of the ball 23. These planes are offset transversely of the axis of rotation of the cylinder 18 due to the transverse offset of the centers of the balls 22 and 23. For this reason, the axes of rotation for the disc 13 and the cylinder 18 do not intersect, since they are not contained in a common plane.

A pair of adjustable pointed bolts 41 and 42 are carried by a lip 43 on the lower portion of the part 11 of the housing to engage the part 12 of the housing and form a fulcrum joint between the two parts 11 and 12. Another pair of adjustable bolts 45 and 46 are mounted in the side of the part 11 to engage the edge of part 12 when the two parts are fitted together.

As may be seen most clearly in Fig. 1, the two parts 11 and 12 are pivoted about the points of bolts 41 and 42 to adjust the relative positions of the driving and driven members. These parts are continuously pressed toward each other by a bolt 47 connecting the two parts and exerting pressure on them by the action of a compression spring 48 against nut 49 and washer 51. Adjustment of the nut 51 and bolt 47 varies the amount of pressure exerted by the spring 48.

Since the cylinder 18 is carried by one part 11 of the casing and disc 13 is carried by the other part 12, pressure on the two parts causes the respective members to exert pressure on the balls and maintain them in frictional engagement. Although the guide rollers or members are subject to wear, this wear is compensated by the continuous pressure exerted by spring 48 through the two parts 11 and 12 of the housing. Since the balls are offset transversely of the axis of the cylinder 18, any wear is compensated by movement of the disc 13 and cylinder 18 toward each other to prevent the introduction of play between these members and their respective balls 22 and 23 or the guide rollers 36 and 37.

It is desirable that the plane defined by the surface of the disc 13 be arranged parallel to the axis of rotation of the cylinder 18 in order to maintain a constant distance between the cylinder and the disc. This is accomplished by turning the bolts 41 for adjusting the position of the lower part 12 of the housing in a manner until the desired relative positions of the disc and cylinder are attained. It is further desirable to have the ball 22 contact the disc 13 along a radial line parallel to the axis of rotation of the cylinder 18. For this purpose, the relationship of the axis of rotation of the disc 13 to that of the cylinder 18 may be varied by adjusting bolts 45 and 46.

In assembling, the part 11 of the casing is held as shown in Fig. 2, the balls are inserted in the ball carriage to assume their offset position so the ball 23 engages the cylinder 18 and the guide roller 37, while the ball 22 rests between the guide roller 36 and the ball 23. The part 12 of the casing is inserted to engage the bolts 41 and 42 and then closed until the disc 13 engages the ball 22. Bolt 47 may be adjusted to compress spring 48 to maintain any desired pressure between the parts 11 and 12, thereby continuously causing disc 13 and cylinder 18 to exert pressure on the balls 22 and 23 for maintaining frictional engagement between the balls and their respective members.

In order to lock the parts of the casing together a spring steel rod 51 is inserted in holes formed in the sides of the part 11 to engage a curved portion 52 of the part 12 to maintain the edge thereof against the ends of bolts 45 and 46.

Figs. 4 and 5 show a variable speed mechanism in which the input and output shafts are geared to two input elements of a differential in a manner such that their speed of rotation is subtracted and the output shaft of the differential is rotated in accordance with the difference between its two speeds. Hence, the output shaft of the variable speed mechanism is always driven in the same direction and it is unnecessary to reverse this direction in order to reverse the direction of rotation of the output element in the differential.

This arrangement permits the use of a conically-shaped driving member 61 that is mounted for rotation in bearings of a bracket 63 which is rigidly attached to a frame 64 for the mechanism. The conically-shaped driving member 61 is rotated from an input shaft 65 by gears 66 and 67. The input shaft 65 is also connected by gear 68 to an input gear 69 of differential 71, the other input of which, as represented by gear 72, is driven from shaft 73 by gears 74 and 75. The conically-shaped driving member 61 drives through offset balls 77 and 78 to rotate the output cylinder 79 on the shaft 74.

The gear ratios are preferably chosen so the two inputs to the differential 71 are driven at the same speed when the balls are positioned midway between the apex and base of the conical driving member 61. Under these circumstances the output of the differential is represented by shaft 96 the rotation of which is zero when the balls are centrally located. When the balls 77 and 78 are displaced along the cone, the speed of the input gear 72 driven from the balls changes and the output shaft rotates in a direction and at a speed dependent on the direction and amount of the displacement of the balls from the neutral position.

The balls 77 and 78, as may be most clearly seen in Fig. 5, are offset transversely of the axis of rotation of the output cylinder 79, so a plane through the center of the ball 77 including the axis of rotation of the driving member 61 is parallel to a plane through the center of ball 78 and including the axis of rotation of the cylinder 79. A guide roller 81 is journaled in the frame 64 and positioned to engage ball 77 and maintain it in contact along an element of the conical surface of the driving member 61.

A second guide roller 82 is carried by a bracket 83 that is pivotally supported on a rod 84 carried by the frame 64. The guide rollers 81 and 82 extend along the path of movement of the balls and are rotatable about axes parallel to the path of movement of the balls. The roller 82 is held in engagement with the ball 78 by the action of a spring 85 on the bracket 83 continuously causing the roller 82 to exert pressure on the ball 78 for maintaining frictional engagement between the balls, the driving member 61 and the driven member 79.

A ball carriage 87 is arranged to move the balls radially of the driving member 61 in the direction of the axis of rotation with the driven member 79 and has arms 88 and 89 carrying hard-surfaced buttons 91 and 92 for engaging the ball 77 at the poles of its axis of principal rotation. A similar pair of buttons 93 and 94 engage the ball 78 at the poles of its axis of principal rotation.

The ball carriage 87 is supported on a lead screw 98 by rollers 99, 99 and has a wheel 101 engaging the threads of the screw 98 for moving the ball carriage axially of the screw. A gear 102 is mounted on the shaft with the screw 98 for turning it to translate the ball carriage radially of the driving member in the direction of the axis of rotation of the driven member 79. An arm 104 on the carriage engages a guide rail 105 to prevent rotation of the carriage about the axis of the screw 98.

Since the connections of the variable speed mechanism avoid the necessity of reversing the direction of rotation of the balls, it is possible to use a conically-shaped driving member instead of the usual disc driving member. A conically-shaped driving member is more compact for the same scale factors as in a corresponding disc. Thus, by the use of a cone driving member the same range of speeds of the output shaft may be obtained by using the same scale factors and still have a more compact mechanism that occupies less space.

The use of offset balls reduces the number of guide rollers required and enables a spring loaded guide roller to continuously exert pressure thereby compensating for wear on the various moving parts. With this arrangement it is possible to mount the driving cone and the output cylinder in bearings in the same frame. This rigid construction avoids the necessity for adjustments, heretofore necessary, to align the balls and the driving and driven members to engage along a radial line of the driving member. The coaction of the spring-loaded roller and the offset balls wholly compensates for wear of the balls and also eliminates the necessity for precision-fitting both in manufacture and maintenance of the equipment. For these reasons, the accuracy of the mechanism is increased, and what is even more important, this increased accuracy is maintained over sustained periods of operation.

When it is necessary to drive the conical driving member in one direction only the action of spring 85 may be used to increase the transmitted torque upon an increase in load. By rotating the driving member 61 clockwise, as seen in Fig. 5, the ball 77 tends to wedge between the ball 78 and the driving member. This increases the pressure on the balls and accordingly increases the friction so greater torque may be transmitted.

If the direction of rotation of cone 61 is reversed, the wedging action is not effected. However, the friction is not reduced below its normal value because any tendency of the ball 77 to move downwardly from the ball 78 is compensated by spring 85. It will be apparent, therefore, that the offset balls and spring pressed rollers may be used to vary the friction according to variations in torque as determined by changes in the load on the mechanism.

Figs. 6 to 9 inclusive show a modified form of a cone driving mechanism embodying the invention and showing other improvements in the ball carriage which may be used in various types of friction driving mechanisms. This mechanism is similar to that shown in Figs. 4 and 5, in that a conically-shaped driving member 111 is mounted in bearings 112 and 113 on bracket 114 carried by frame 115. The cone is driven from an input shaft 116 through gear 117. A gear 118 also on a shaft 116 drives one input of a differential 119, as represented by gear 121.

The cone drive 111 engages ball 124 which in turn engages another ball 125 that drives the output cylinder 126 mounted on shaft 127 rotatably supporting the cylinder 126 in the frame 115. A gear 128 on the shaft 127 drives to another gear 129 to rotate a second input as represented by gear 131 for the differential 119, whereby output shaft 133 carrying gear 134 is rotated at a speed proportional to the difference in the speed of rotation of the shafts 116 and 127.

The balls 124 and 125 have their centers offset as shown most clearly in Fig. 7 transversely of the axis of rotation of output cylinder 126. A ball carriage 138 for holding the balls 124 and 125 in position is supported by rollers 139, 139 on a lead screw 141 and has a wheel 142 adapted to engage the threads of the screw for moving the balls radially of the cone drive 111 in the direction of the axis of rotation for output cylinder 126. An arm 145 carries a roller 146 engaging a guide rail 147 to prevent rotation of the ball carriage about the longitudinal axis of lead screw 141.

As previously described, rollers or buttons, at the poles of the axes of normal rotation for the respective balls cause considerable wear of the balls, particularly when the mechanism is driven continuously for any one translatory position of the ball carriage. In order to avoid this wear the ball carriage 138 carries a pair of angularly disposed rollers 151 and 152 engaging the ball 124 on opposite sides of a plane defined by the center of the ball 124 and its points of contact with the driving cone 111 and the other ball 125. These angularly disposed axes for the rollers 151 and 152 are preferably contained in a plane through the center of the ball 124 that is perpendicular to the plane defined by the center of the ball and its points of contact.

A bellcrank lever 155 is pivotally mounted at 156 on the ball carriage and has an arm 157 carrying a second pair of rollers 158 and 159 angularly disposed at angles of approximately 45° engaging the ball 125 on opposite sides of the plane defined by the center of the ball 125 and its points of contact with the ball 124 and the output cylinder 126. Preferably the axes of rotation of the rollers 158 and 159 are also contained in a plane through the center of the ball that is perpendicular to the plane defined by the center of the ball and its points of contact.

Another arm 161 of the bellcrank lever 155 is connected by a bolt 162 and spring 163 for continuously exerting pressure through the lever 155 and the rollers 158 and 159 to force the ball 125 into engagement with ball 124 and cylinder 126, for maintaining frictional engagement between the balls and the respective members.

The use of the angularly disposed rollers together with the offset of the center of the balls transversely of the axis of rotation of the output cylinder 126 reduces the wear on the balls and continuously compensates by the pressure of spring 163 for any wear in the mechanism. This arrangement further simplifies assembly of the mechanism by avoiding the precision fit between the balls and the guide rollers as well as eliminating buttons or rollers at the poles of the balls.

With the angularly disposed rollers, it is necessary only to insert the balls in the carriage and compress the spring 163 by bolt 162 until the balls are forced into position between the driving cone 111 and the output cylinder 126.

Although the guide rollers are preferably arranged at angles of 45° on opposite sides of the planes defined by the centers of the balls and their respective points of contact, it should be apparent that comparable results may be obtained by arranging these rollers at any angle to act on opposite sides of the balls for maintaining them in their respective positions.

The ball 124, as shown most clearly in Fig. 7, is retained in position by the action of forces from three directions, namely, the pair of guide rollers 151 and 152, the driving cone 111 and the ball 125. Similarly, forces from three directions maintain the ball 125 in position, as represented by the pair of guide rollers 158 and 159, the ball 124 and the output cylinder 126.

The arrangement of the guide rollers 158 and 159 in the bellcrank lever 155 on the ball carriage 138 to apply the pressure from spring 163 continuously on the ball 125 avoids the necessity for providing spring pressure between the driving and driven members. Therefore, both of these members may be rigidly supported in the frame 115 to provide a sturdier structure and avoid precision fitting during assembly of the mechanism. If the driving cone and the driven member are arranged in their approximately correct positions, any slight differences are automatically compensated when the balls are inserted, since the action of pressure from spring 163 automatically causes the balls to assume positions for accurately transmitting motion from the driving member to the driven member.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A variable speed mechanism comprising a two-part casing having a fulcrum joint at one side, a rotary driving member carried by one of said parts, a driven member supported in the other of said parts for rotation about an axis, a pair of balls for transmitting motion from said driving member to said driven member, guide rollers for retaining said balls with their centers offset transversely of said axis, and resilient means exerting pressure tending to move the two parts of said casing together about said fulcrum joint to cause said members to exert pressure on said balls for maintaining frictional driving engagement between said balls and said members.

2. A variable speed mechanism comprising a two-part casing having a fulcrum joint at one side, a rotary driving member carried by one of said parts, a driven member supported in the other of said parts for rotation about an axis, a pair of balls for transmitting motion from said driving member to said driven member, a pair of guide rollers, one engaging each of said balls for retaining said balls with their centers offset transversely of said axis, and resilient means exerting pressure tending to move the two parts of said casing together about said fulcrum joint to cause said members to exert pressure on said balls for maintaining frictional driving engagement between said balls and said members.

3. A variable speed mechanism comprising a two-part casing having a fulcrum joint at one side, a rotary driving member carried by one of said parts, a driven member supported in the other of said parts for rotation about an axis, a pair of balls for transmitting motion from said driving member to said driven member, guide rollers for retaining said balls with their centers offset transversely of said axis, resilient means exerting pressure tending to move the two parts of said casing together to cause said members to exert pressure on said balls for maintaining frictional driving engagement between said balls and said members, and means cooperating with said fulcrum joint to adjust the relative positions of the parts of said casing for correcting the alignment of said members.

4. A variable speed mechanism comprising a bipartite casing, a driving disc journalled in one part of the casing and a driven roller journalled in the other, a movable ball carriage, a pair of motion transmitting balls carried thereby, the balls being so disposed that a common center line thereof forms an acute angle with the disc, a guide roller disposed in the casing in engagement with one of the balls and parallel to the path of the ball carriage for guiding said ball along a diameter of the disc and means for detachably coupling one part of the casing to the other including means for adjusting the first-mentioned part of the casing to align the center of the disc with the path of the ball in engagement therewith.

5. A variable speed mechanism comprising a bipartite casing, a driving disc journalled in one part of the casing and a driven roller journalled in the other, a movable ball carriage, a pair of cooperating motion transmitting balls carried in staggered relation thereby respectively in frictional engagement with the disc and roller, adjustable bolt means forming a pivotal connection between corresponding sides of the respective parts of the casing, and yielding means connecting opposite corresponding sides of the parts of the casing tending to press the respective balls against the disc and the roller, the arrangement being such that the bolt means may be adjusted to so position the disc that the ball engaged thereby has a path along a diameter thereof.

6. A variable speed mechanism comprising a bipartite casing, a driving disc journalled in one part of the casing, a driven roller journalled in the other, a movable ball carriage, a pair of cooperating motion transmitting balls carried in staggered relation thereby respectively in frictional engagement with the disc and roller, adjustable bolt means carried by one part of the casing for positioning the disc with respect to the balls and forming a pivotal connection between corresponding sides of the respective parts of the casing, guide rollers, one for each ball disposed within the casing, adjustable spring means connecting the respective parts of the casing tending to hold the same together and to turn the same on the adjustable bolt means to press the balls between the disc and driven roller, the balls being respectively in rolling engagement with the guide roller associated therewith.

7. A variable speed mechanism comprising a bipartite casing, a driving disc journalled in one part of the casing and a driven roller journalled in the other, a movable ball carriage, a pair of cooperating motion transmitting balls carried in staggered relation thereby respectively in frictional engagement with the disc and roller, means for fastening one part of the casing to the other, said fastening means including means for positioning the disc to align a diameter of same with the path of the ball engaged thereby, and further fastening means for the parts including a spring effective to press the balls between the disc and roller.

8. A variable speed mechanism comprising a separable bipartite casing, a driving disc journalled in one part of the casing and a driven roller journalled in the other, a movable ball carriage, a pair of motion transmitting balls carried thereby, the balls being so disposed that a common center line thereof forms an acute angle with the surface of the disc, a pair of guide rollers journalled in the last-mentioned part of the casing disposed respectively in engagement with one of the balls and on opposite sides of the ball carriage, means for detachably coupling one part of the casing with the other adjustable to align the center of the disc with the path of the ball engaged thereby and further detachable coupling means for the parts of the casing including a spring tending to press the parts together and thereby pressing the balls between the disc and driven roller.

CHARLES H. RICHARDSON.

REFERENCES CITED

The following references are of record in the file of this patent:

UNITED STATES PATENTS

| Number | Name | Date |
|---|---|---|
| 1,229,879 | Buffat | June 12, 1917 |
| 2,271,688 | Forster et al. | Feb. 3, 1942 |
| 2,357,035 | Treese et al. | Aug. 29, 1944 |
| 2,377,898 | Myers | June 12, 1945 |

FOREIGN PATENTS

| Number | Country | Date |
|---|---|---|
| 130,163 | Great Britain | July 28, 1919 |
| 165,865 | Great Britain | Oct. 1, 1919 |
| 505,744 | France | May 14, 1920 |